United States Patent [19]

Burkart

[11] Patent Number: 5,740,843

[45] Date of Patent: Apr. 21, 1998

[54] CONTAINER FILLING DEVICE AND METHOD

[75] Inventor: Ulrich Burkart, Schwaebisch Hall, Germany

[73] Assignee: Optima-Maschinenfabrik Dr. Buhler GmbH & Co., Germany

[21] Appl. No.: 628,796

[22] Filed: Apr. 5, 1996

[30] Foreign Application Priority Data

Apr. 7, 1995 [DE] Germany .......... 195 13 103.7

[51] Int. Cl.⁶ .......... B65B 43/52; B65B 43/56
[52] U.S. Cl. .......... 141/79; 141/1; 141/12; 141/83; 141/129; 141/168
[58] Field of Search .......... 141/83, 145, 129, 141/168, 184, 78, 79, 1, 11, 12

[56] References Cited

U.S. PATENT DOCUMENTS

| 2,684,803 | 7/1954 | Birkland et al. ........ 141/79 X |
| 2,880,763 | 4/1959 | Warner ........ 141/79 |
| 3,073,400 | 1/1963 | Bauder et al. ........ 141/83 X |
| 3,306,323 | 2/1967 | Aronson ........ 141/78 X |
| 3,566,613 | 3/1971 | Kinney ........ 141/83 X |
| 3,623,844 | 11/1971 | Anthon ........ 141/79 X |
| 3,924,384 | 12/1975 | Kinney . |
| 4,972,882 | 11/1990 | Kohashi ........ 141/83 X |

FOREIGN PATENT DOCUMENTS 42 07 280  8/1993  Germany .

*Primary Examiner*—J. Casimer Jacyna
*Attorney, Agent, or Firm*—Quarles and Brady

[57] ABSTRACT

A device for filling containers contains a transfer mechanism drivable by a servodrive and which cyclically moves the containers initially to a filling station and then to a balance. By reverse rotation and optionally subsequent forward rotation of the servodrive by a small angle of e.g. 1°, it is possible to disengage the transfer mechanism from the containers, so that the latter can be weighed on the balance, without the measured result being falsified by friction between the transfer mechanism and the containers.

By multiple rotating backwards and forwards the servodrive by a small angle, it is possible to vibrate the container, so that bridges and the like forming in the material to be filled can be eliminated.

10 Claims, 1 Drawing Sheet

CONTAINER FILLING DEVICE AND METHOD

BACKGROUND OF THE INVENTION

The invention is directed at a container filling device with the aid of which individual containers, which are delivered empty, are filled and optionally weighed.

In known devices of this type a transfer mechanism is provided, which is driven in a mechanical manner and geared motors or the like can be used for this purpose. The transfer device operates in a cyclic or timed manner, because the container to be filled must stop in the filling station. In the case of a purely mechanical solution this cycle interval, i.e. the distance over which the transfer mechanism conveys a container during a cycle, is fixed. A change can only be made with considerable effort and expenditure.

The problem of the invention is to provide a device for filling containers allowing a greater flexibility in operation.

BRIEF SUMMARY OF THE INVENTION

For solving this problem the invention prepares a device for filling containers comprising a supply mechanism, which successively supplies a number of containers to be filled; a filling station, in which single container is filled, a delivery station, from which the filled containers can be removed, a cyclically operating transfer mechanism, which takes individual containers from the supply mechanism, moves them to the filling station, stops them there during filling and, after filling, moves them to the delivery station. The device further comprises a drive for the transfer mechanism, which has a servo-motor with a control for the latter.

The invention also proposes a method for filling containers, wherein a container to be filled is moved by a transfer mechanism to a filling station, where it is stopped and filled, the container is moved to a balance and disengaged there from the transfer mechanism and weighed, after which it is moved to a delivery position. Alternatively, after filling, the container is vibrated by a short-travel moving backwards and forwards of the transfer mechanism and is subsequently moved to a delivery position. Further developments of the invention form the subject matter of the dependent claims.

Through the use of a servodrive for the transfer mechanism, the device according to the invention can be much more easily adapted to the different circumstances. By modifying the control sequence it is possible with limited effort to modify the cycle interval and further parameters of the device. Therefore the device can be adapted to different circumstances.

According to the invention the device can have a balance, which is positioned between the filling station and the delivery station. In this case the transfer mechanism is constructed in such a way that it moves the container to the balance and leaves it standing there, so that it can be weighed uninfluenced by the transfer mechanism.

According to the invention the control for the servomotor can be constructed in such a way that the latter can be rotated backwards by a small angle. This angle can e.g. be 1° to 2°. This backward or reverse rotation of the servomotor leads to a reverse movement of the transfer mechanism by a short distance, which is just sufficient to disengage the transfer mechanism from the container. Thus, in this case the container is located on the balance, uninfluenced by the transfer mechanism, so that its weight or the weight of its content can be precisely determined. This reverse rotation of the servo-motor is also effective in the filling mechanism, if the transfer mechanism has several reception positions. It is therefore possible to weigh the container content directly at the filling station, because also here the transfer mechanism is disengaged from the container. It is also possible for freeing the container for there to be initially a reverse movement and then a forward movement of the transfer mechanism by a smaller angle.

According to a further development of the invention, the control for the servomotor can be constructed in such a way that it can perform a sequence of alternate reverse-forward rotations with a small rotation angle. It can be a very small angle of about 1°, so that vibrating occurs on the container. The number of rotations can be so adjusted that the desired result is always achieved. It is also conceivable to perform the vibrating movement in such a way that a forward rotation by a somewhat larger angle is performed than in the in each case following reverse rotation.

The method proposed by the invention contains as an important feature the fact that the drive is rotated back somewhat when the container stands on the balance. Thus, weighing takes place without any influencing by the transfer mechanism.

As a result of the multiple rotating backwards and forwards of the servomotor proposed by the invention a container vibration is achieved, so that the product filled into it can be loosened and can sink, so that arching or bridging is eliminated.

Further features, details and advantages can be gathered from the claims, whose wording is made by reference to content of the description, the following description of a preferred embodiment of the invention and the attached drawings, wherein show:

DETAILED DESCRIPTION OF THE INVENTION

Figure 1:
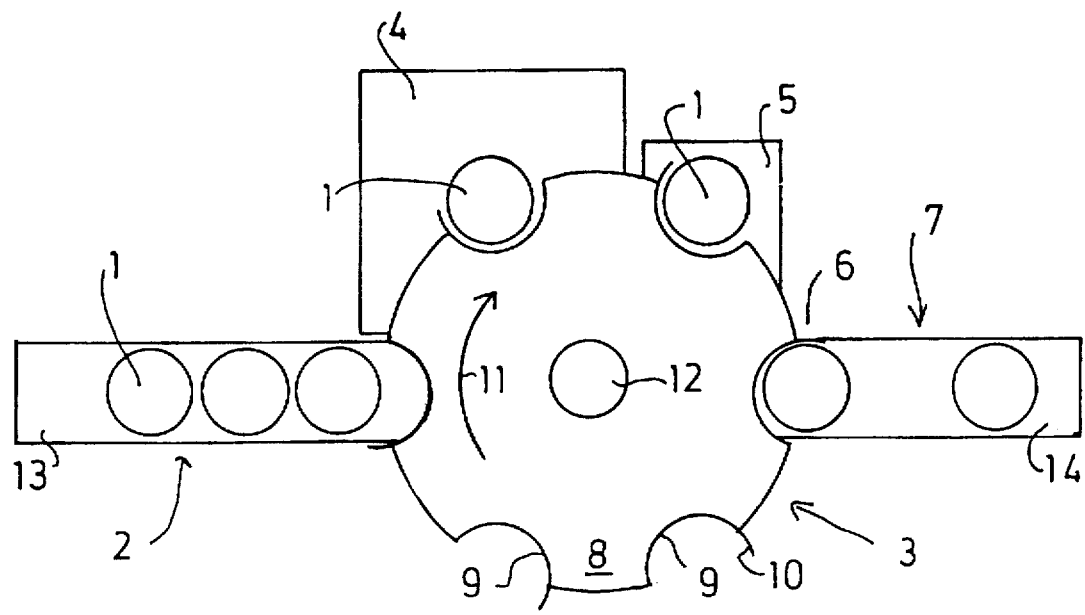
FIG. 1 Diagrammatically a plan view of a device according to the invention.

The device for filling containers 1 shown in greatly simplified form in FIG. 1 contains a feed or supply mechanism 2, which brings in a number of containers I. With the aid of a transfer mechanism 3 the containers 1 are moved in a predetermined direction to a filling station 4. The filling station 4 contains a filling position located along the movement path of the containers 1 and having a given cycle interval from the supply mechanism 2. In the represented embodiment the cycle interval corresponds to the arc length of the circular movement path. In the movement direction behind the filling station 4 is located a balance 5, the cycle interval between the balance 5 and the filling station 4 being the same as the cycle interval between the filling station 4 and the supply mechanism 2.

Following onto the balance 5 with the same cycle interval is provided a delivery station 6 from which the containers 1 are conveyed away with the aid of a removal mechanism 7.

The transfer mechanism 3 is constructed in such a way that it operates cyclically. Therefore it always stops in the position shown in FIG. 1. In this position a container 1 to be filled is in the filling position of the filling station 4 and a filled container is in the weighing position of the balance 5.

In the represented embodiment the transfer mechanism contains a cycle star 8, i.e. a rotating wheel with several reception positions 9, whose circumferential spacing is the same as the cycle interval. At the reception positions 9 is located on one side a gripper 10, which can e.g. be in the form of a guard rail, which engages laterally on the containers 1 and advances same in the direction of the arrow 11.

In the represented example of the cycle star 8, the transfer mechanism 3 with the reception positions 9 and the grippers 10 is driven by a servomotor 12, whose axis is shown centrally in FIG. 1. This servomotor is controlled by a control and is so constructed that it can move in both directions by random angles.

Figure 2:
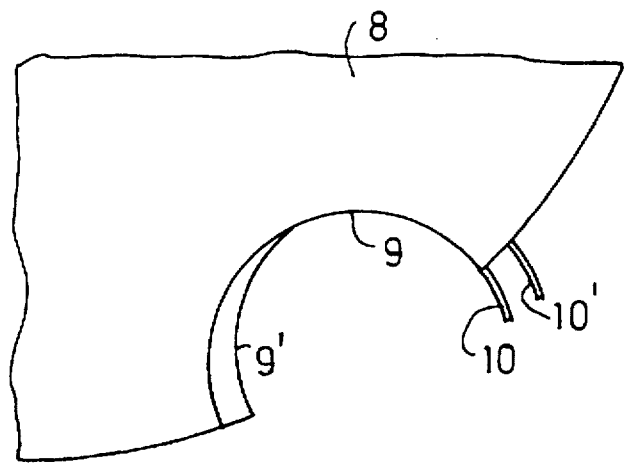
FIG. 2 On a larger scale a partial View of the arrangement of FIG. 1.

FIG. 2 shows on a larger scale a detail of a cycle star 8 in the vicinity of a reception position 9, FIG. 2 showing said cycle star 8 in two positions. The gripper 10 constitutes an extension of the arcuate shape of the edge of the reception position 9.

The device shown in FIGS. 1 and 2 is operated as follows. In the starting position shown in FIG. 1 a reception position 9 is located aligned with the containers 1 of the supply mechanism 2. The supply mechanism 2 can e.g. contain a conveyor belt 13, which conveys the individual containers 1 in a dense sequence in the direction of the transfer mechanism 3. The leading container 1 in the conveying direction enters the receptacle 9 of the cycle star 8. The servodrive is then controlled in such a way that the servomotor 12 rotates the cycle star 8 by 60° in the direction of the arrow. The servomotor 12 remains in this position and so does the cycle star 8. A container 1 is now in the filling position of the filling station 4 and a second container 1 stands on the balance 5. The servomotor 12 is now rotated rearwards by an angle of e.g. 2°, i.e. in the opposite direction to the arrow 11. Optionally there can then be a short forward rotation of e.g. 1°. The container 1 in the filling station 4 and the container 1 on the balance 5 remain standing, so that as a result of the reverse rotation the gripper 10 and the rear edge of the reception position 9 in the circumferential direction are not in contact and therefore not in engagement with the outside of the container 1.

As the edge of the reception positions 9 is circular with a diameter larger than the circular diameter of the container 1, during the forward movement the container 1 is only in engagement with the reception positions 9 in the vicinity of its rear side in the movement direction. Due to the reverse rotation the container 1 is disengaged on all sides from the cycle star 8 and the servomotor 12 stops in this position. One container 1 can be filled and a second container weighed. It would be conceivable to perform the weighing process directly in the filling station, because also the container there is not in engagement with the transfer mechanism 3.

After filling one container and weighing the other, the servomotor 12 is again rotated by 60° in the forward direction, so that the last weighed container 1 passes into the delivery position 6 and the last filled container 1 onto the balance 5. The servomotor 12 is then rotated rearwards by a small amount, so as to disengage the transfer mechanism 3 from the containers. The container in the delivery position 6 can then be transported away by the drive of the removal mechanism 7, which can also contain a conveyor belt 14.

FIG. 2 shows a receptacle 19 with the associated gripper 10 in a particular position and simultaneously the receptacle in a position rotated back by a small angle, represented by the apostrophes after the reference numerals.

According to the invention, the control of the servomotor 12 can be so constructed that this reverse and subsequent forward rotation can be repeated several times, which leads to a vibration of the container or its content. Thus, freely flowing material can be vibrated back into the container, which eliminates bridging and arching and the material is settled in the container. The vibrating process can be carried out on a mechanism having no balance, but can also be performed on a filling mechanism with balance. Thus, it is e.g. possible to carry out vibration prior to weighing, i.e. initially a multiple rotating backwards and forwards of the servomotor with a following freeing by a reverse rotation.

For vibration purposes it is also possible to reverse rotate e.g. by an angle of 1° and subsequently carry out a forward rotation by 1.5°, this being repeated several times.

The use of a transfer mechanism with the aid of a servodrive makes it possible to achieve freely adjustable and rapidly modifiable division steps, thereby saving mechanically complicated cyclic gears.

The invention claimed is:

1. A device for filling containers comprising:
   a supply mechanism, which successively supplies in a forward direction a number of containers to be filled;
   a filling station, in which a single container is filled;
   a delivery station, from which the filled containers can be removed;
   a cyclically operating transfer mechanism, which receives the individual containers from the supply mechanism, moves the individual containers to the filling station, stops the individual containers at the filling station during filling, and after filling, moves individual containers to the delivery station;
   the forward direction being a sequence of events from the supply mechanism to the filling station and then to the delivery station; and,
   a drive for the transfer mechanism, having a servo-motor with a servo-motor control, the transfer mechanism being disengageable from the containers by a reverse rotation of the transfer mechanism.

2. A device according to claim 1, comprising a balance positioned between the filling station and the delivery station, the transfer mechanism being constructed in such a way as to move each of the single containers from the filling station to the balance.

3. A device according to claim 2, wherein the cycle interval between the supply mechanism and the filling station is the same as the cycle interval between the filling station and the balance.

4. A device according to claim 1, wherein the control for the servo-motor is constructed in such a way that said servo-motor can be rotated backwards by a small angle.

5. A device according to claim 1, wherein the control for the servo-motor is constructed in such a way that said servo-motor can perform a sequence of alternate backwards and forwards rotations with a small rotation angle.

6. A method for filling containers, comprising the steps of:
   moving a container to be filled in a forward direction by a rotary transfer mechanism to a filling station;
   stopping the container at the filling station and filling the container;
   moving the filled container to a balance;
   disengaging the filled container from the transfer mechanism and weighing the container;
   moving the weighed container to a delivery position, the forward direction being a sequence of steps from the filling station to the delivery position; and,
   disengaging the transfer mechanism from the delivered container by rotating the transfer mechanism in reverse.

7. A method for filling containers according to claim 6, further comprising the steps of:

rotating the transfer mechanism with a rotatable drive; and, disengaging the container from the transfer mechanism by rotating the drive in reverse.

8. A method for filling containers according to claim 6, further comprising the step of driving the transfer mechanism with a servo-motor.

9. A method for filling containers, comprising the steps of:

moving a a container to be filled to a filling station by a rotary transfer mechanism having a controllable rotary drive;

stopping the container at the filling station and filling the container moving the filled container by the transfer mechanism to a delivery position; and, while moving the filled container to the delivery position, vibrating the filled container by controlling the rotary drive to impart to the transfer mechanism a short-travel backwards and forwards rotation.

10. A method for filling containers according to claim 9, comprising the steps of:

rotatably driving the transfer mechanism with a servo-motor; and, vibrating the container by controlling the servo-motor to undergo a short-travel forward and backwards rotation.

* * * * *